US006262141B1

(12) United States Patent
Cywar et al.

(10) Patent No.: US 6,262,141 B1
(45) Date of Patent: Jul. 17, 2001

(54) PROCESS FOR THE PREPARATION OF POLYMERS HAVING LOW RESIDUAL MONOMER CONTENT

(75) Inventors: Douglas A. Cywar, Danbury; Roderick G. Ryles, Milford; Melvyn Holdsworth, Fairfield, all of CT (US)

(73) Assignee: Cytec Technology Corporation, Wilmington, DE (US)

( * ) Notice: Subject to any disclaimer, the term of this patent is extended or adjusted under 35 U.S.C. 154(b) by 0 days.

(21) Appl. No.: 09/413,351

(22) Filed: Oct. 6, 1999

(51) Int. Cl.[7] .................................. C08J 3/28; C08J 3/12; C08F 2/50

(52) U.S. Cl. .............................. 522/42; 522/84; 522/152; 523/300; 523/330; 524/815; 524/827; 524/831; 524/832

(58) Field of Search ................................ 522/42, 84, 173, 522/175, 182, 152, 162; 523/300, 330; 524/815, 827, 831, 832; 526/89, 219.5, 229, 304, 307.7, 328

(56) References Cited

U.S. PATENT DOCUMENTS

| | | | |
|---|---|---|---|
| 3,755,280 | | 8/1973 | Saunders . |
| 4,132,844 | | 1/1979 | Coville . |
| 4,178,221 | | 12/1979 | Boutin et al. . |
| 4,252,625 | | 2/1981 | Boutin et al. . |
| 4,306,955 | | 12/1981 | Neel et al. . |
| 4,308,148 | | 12/1981 | Boutin et al. . |
| 4,654,378 | * | 3/1987 | Hunter et al. . |
| 4,690,788 | * | 9/1987 | Yada et al. . |
| 4,762,862 | * | 8/1988 | Yada et al. . |
| 4,874,827 | * | 10/1989 | Kanluen et al. . |
| 4,929,717 | | 5/1990 | Chmelir . |
| 5,294,688 | * | 3/1994 | Rehmer et al. . |
| 5,519,088 | * | 5/1996 | Itoh et al. . |

FOREIGN PATENT DOCUMENTS

| | | |
|---|---|---|
| 19748153 | 5/1999 | (DE) . |
| 53-051289 | 5/1978 | (JP) . |
| 57-121009 | 7/1982 | (JP) . |
| 59-133212 | 7/1984 | (JP) . |
| 10-298215 | 10/1998 | (JP) . |
| 11-035612 | 2/1999 | (JP) . |
| 61-115909 | 6/1999 | (JP) . |

OTHER PUBLICATIONS

WO 97/29136 Aug. 14, 1997, PCT.

WO 99/07838 Feb. 18, 1999, PCT.

* cited by examiner

*Primary Examiner*—Susan W. Berman
(74) *Attorney, Agent, or Firm*—Fitzpatrick, Cella, Harper & Scinto

(57) ABSTRACT

Methods of preparing an acrylic polymer according to the present invention comprise the steps of: forming a gelled polymer by polymerizing a mixture containing an acrylic monomer and a photoinitiator; comminuting the gelled polymer to produce gel particles; and irradiating the gel particles with light to decompose the photoinitiator, simultaneously with, or after, the step of comminuting. The gel particles may be irradiated with UV light while they are being dried in a fluid-bed dryer.

34 Claims, No Drawings

PROCESS FOR THE PREPARATION OF POLYMERS HAVING LOW RESIDUAL MONOMER CONTENT

BACKGROUND OF THE INVENTION

1. Field of the Invention

This invention relates to the preparation of high molecular weight polymers having a low residual unreacted monomer content by a gel-type polymerization process. Such polymers are frequently used as flocculants for the treatment of impure water, and may find other uses in drag reduction, adhesives, coatings, and textile and paper sizes.

2. Description of the Prior Art

A gel-type polymerization process can be used to manufacture polymers. That is, an aqueous solution containing between 20 and 60% by weight total monomer is subject to polymerization such that a stiff, rubbery gel is formed from the initially liquid solution. The gel is then pulverized to form particles about 4 mm in size, followed by drying to remove about 90% of the water present. Finally, the dried particles are crushed to a smaller size to produce a granular powder suitable for sale.

It has long been desired to reduce the residual monomer content of polymers produced by gel-type polymerization. Acrylamide monomer, for example, is deemed toxic, and governmental regulations place an upper limit on the permissible acrylamide monomer content. This limit generally varies from between 250 ppm to 1000 ppm depending on the intended end-use, which might include clarification of water ultimately intended for human consumption. New legislation in some European countries, however, may deem the upper acceptable limit to be as low as 100 ppm, which is difficult or expensive to achieve in certain types of polymeric products using known manufacturing techniques. Because of this legislation, as well as a general commonsense desire to reduce the toxicity of products that may be handled by people and used for an application such as treatment of drinking water, there exists a need for efficient manufacturing processes that can produce acrylamide polymers having a very low content (less than 100 ppm) of residual acrylamide.

Gel polymerizations on an industrial scale generally use a redox or an azo initiating system, often in combination with each other. In a redox initiation system polymerization is initiated by radicals formed by an oxidizing agent and a reducing agent used together, such as a combination of persulfate (oxidizing agent) and thiosulfate (reducing agent). In an azo initation system, radicals are produced thermally using one or more azo initiators, such as azobis(2-amidinopropane)dihydrochloride. As used herein, a redox-azo intiation system refers to a polymerization in which both redox and azo initiators are used.

Alternatively a photopolymerization process may be used, whereby one or more photoinitiators is added and the monomer solution irradiated by ultraviolet (UV) or visible light. A redox/azo system can also be combined with a photopolymerization process. For each of these gel polymerization systems there exist methods to achieve low residual monomer, but each has its own shortcomings.

The residual monomer present in ground gel produced from any of the aforementioned polymerization processes can be reduced by at least three general methods. One method is extractive washing which uses methanol or other solvent, as described, for example in Japanese Patent Publication JP-P 53-051289. However, this method requires the use of a large amount of flammable solvents and is not desirable from the viewpoint of safety and economy.

Another method for the reduction of residual monomer is by addition of an alkali metabisulfite or sulfite, or by treatment with sulfur dioxide, as described in U.S. Pat. Nos. 3,755,280, 4,929,717, and 4,306,955 and Japanese Patent Publication JP-P 61-115909. However these methods can result in a discharge of sulfur dioxide during the subsequent drying step, particularly in the case of gels made at a pH less than 4, as is the usual case when acrylamide is copolymerized with cationic ester monomers. Such discharge in the dryer results in an environmentally unacceptable emission to the atmosphere, necessitating expensive scrubbing equipment. Another problem with sulfite and sulfur dioxide treatments is that polymer degradation can occur, leading to decreased flocculant performance.

A third general method for reduction of residual monomer is by treatment with amidase enzyme, as described in published PCT Application Nos. WO 97/29136 and WO 99/07838. However, amidase enzyme and compositions containing amidase enzyme are relatively expensive, and the residues left in the product may be hazardous to people and fall under regulatory scrutiny. An additional drawback of amidase treatment is the greatly decreased effectiveness on cationic gels made at low pH, as well as a further reduction in effectiveness that occurs as a result of the common practice of including organic acids such as adipic acid in the cationic gels.

A general problem with the methods described in the above-cited patents (with the exception of the methods using sulfur dioxide gas, which poses health hazards and can be corrosive to metal equipment) is that the methods require a liquid or solid substance to be intimately mixed into the gel. This can require specialized equipment and is difficult to accomplish on an industrial scale.

With regard to a redox or redox/azo polymerization system, there are several ways to produce polymer with reduced residual monomer content. The polymerization time can be lengthened, optionally in conjunction with heating to hold the gel at a high temperature, as described in U.S. Pat. No. 4,132,844. However, this option leads to a decrease in the production rate on an industrial scale or the need for a large amount of plant space. Another method is to increase the amount of redox and/or azo initiator, but this generally leads to gelled polymers having lower molecular weight and decreased flocculant performance. In certain commercially significant acrylamide copolymers, such as copolymers of acrylamide and cationic ester monomers, it is difficult to obtain less than 100 ppm residual acrylamide using either of these methods, even if a longer polymerization time is combined with increased amounts of redox and/or azo initiators.

A photopolymerization process as described, for example, in U.S. Pat. No. 4,178,221, has the potential to produce gelled polymers having very low residual acrylamide content. Such a process has a significant shortcoming, however, relative to a redox/azo system in that the thickness of the gel is limited by the extent to which light can penetrate and initiate polymerization. This thickness depends not only on the light intensity but also on the amount of light-absorbing photoinitiator or sensitizer which is used. The use of less photoinitiator allows light to penetrate to greater depths, but because fewer radicals are produced, the overall rate of polymerization is reduced. For a given light intensity, which is limited by the commercially available equipment, it is therefore necessary to strike a balance between the level of initiator and the gel thickness to achieve a reasonable production rate while still obtaining low residual monomer content in the polymer. This thickness is generally far less than what is practiced using a redox/azo system, so that the production rate for a photopolymerization process is far less for a given factory size.

The combined use of redox initiators and photoinitiator is described in Japanese Patent Publications Nos. JP-P 57-121009 and JP-P 59-133212. Here, the first and greater part of the polymerization is affected by redox initiation, while the last part of the polymerization is affected by light irradiation in combination with the photoinitiator. Alternatively, redox and photopolymerization can occur together as described in German Patent No. 19748153. However, the processes described in these patents do not overcome the aforementioned shortcoming of photopolymerization systems. In particular, the gel thickness is limited by the ability of light to penetrate. For either a photopolymerization process or a combined redox and photopolymerization process, the prior art describes a sequential process of polymerization to produce a gel, during which time irradiation may occur in the case of a photopolymerization or a combined redox and photopolymerization process, followed by comminution of the gel to produce gel particles, followed by drying of the gel particles.

SUMMARY OF THE INVENTION

In one embodiment, a process of preparing an acrylic polymer according to the present invention comprises the steps of: forming a gelled polymer by polymerizing a mixture containing an acrylic monomer and a photoinitiator; comminuting the gelled polymer to produce gel particles; and irradiating the gel particles with light to decompose the photoinitiator, simultaneously with, or after, the step of comminuting.

In another embodiment, a process of preparing a water soluble acrylamide polymer according to the invention comprises the steps of: forming a gelled polymer by polymerizing an aqueous solution containing an acrylamide monomer and a photinitiator, comminuting the gelled polymer to produce gel particles, drying the gel particles in a fluid-bed dryer; and irradiating said gel particles with light during at least part of said drying step to decompose the photoinitiator, wherein the step of irradiating is performed simultaneously with or after the step of comminuting.

In yet another embodiment an acrylate polymer is prepared employing an acrylate monomer.

DETAILED DESCRIPTION OF THE INVENTION

This invention can be used to prepare a wide variety of polymers having low residual monomer content. The methods of the present invention are particularly suitable for use with acrylic polymer gels, including polyacrylamide, polyacrylate, and all types of acrylamide and acrylate copolymers, to the extent that gel polymerization techniques can be employed.

When monomer is polymerized to produce polymer, monomer that is not converted to polymer is referred to as "residual monomer content" in the resulting polymer. As used herein, "residual monomer" is used interchangeably with the term "unreacted monomer." By contrast, a component that does not participate in a polymerization reaction cannot be considered residual or unreacted.

Typical gelled polymers include polyacrylics, including polyacrylates, polyacrylamides, and acrylamide-acrylate copolymers. Generally speaking, these gelled polymers are water soluble, although water swellable polymers and polymers comprising water insoluble moieties are also contemplated. Low residual monomer content is obtained according to the invention by comminuting a gelled polymer including a photoinitiator into particles, and irradiating the particles with UV light to further polymerize the unreacted monomer or monomers.

The selection of monomers used to form the gelled polymer is not particularly limited, provided that such monomers must be able to form a gelled polymer capable of being comminuted, and that such gelled polymer must be susceptible to further photoinitiated polymerization to reduce the residual unreacted monomer content. One of ordinary skill in the art will readily understand the nature of the monomers meeting these criteria, based on the specific illustrative examples included below.

Nonionic, anionic, and cationic polyacrylics and, preferably, polyacrylamides, can be prepared. Polyacrylic homopolymers, preferably acrylamide homopolymers, can be prepared as well as copolymers. Polyacrylic copolymers are formed with one or more nonionic, anionic, and cationic monomers which are polymerized with the acrylic monomer, preferably acrylamide.

Examples of typical nonionic monomers are methacrylamide, acrylamide, N-substituted and N-,N-substituted acrylamides or methacrylamides, and esters of (meth)acrylic acid. Examples of typical anionic monomers are acrylic acid and its salts, methacrylic acid and its salts, methallylsulfonic acid, vinylbenzenesulfonic acid and the soluble salts or esters thereof, and 2-acrylamido-2-methylpropanesulfonic acid and its salts. Typical examples of cationic monomers are diallyl dimethyl ammonium chloride and quaternary ammonium salts of dialkylaminoalkyl (meth)acrylates such as 2-(N,N-dimethylamino)ethyl acrylate, and salts of dialkylaminoalkyl(meth)acrylamides. These examples are not exhaustive and do not limit the scope of the invention.

Polyacrylics such as polyacrylate and polyacrylic acids can also be prepared. Homopolymers and copolymers of such acrylates or acrylic acids can be prepared. Typical acrylate or acrylic acid monomers include butyl acrylate, butyl methacrylate, acrylic acid, methacrylic acid, 2-(N,N-dimethylamino)ethyl acrylate and the like.

In a preferred embodiment, the invention utilizes one or more photoinitiators added to an aqueous monomer solution before an initial polymerization. The initiation of polymerization occurs by the action of redox initiators and/or by one or more azo compounds undergoing thermal decomposition. This initial polymerization can take place in the dark and provides a product that has a residual monomer content of no more than about 10,000 ppm, and preferably no more than about 1000 ppm, based on the weight of the gelled polymer in the absence of any subsequent irradiation step. It is not believed that the photoinitiator takes part in the initial polymerization when the reaction is carried out in the dark since the reaction rate and polymer properties, as measured for polymer produced without subsequent irradiation, are unchanged by its presence. Of course, it is possible that some of the photoinitiator may be inactivated during the initial polymerization reaction owing to the complex reaction sequences and extreme reaction conditions encountered. Photoinitiators having an alpha-hydroxyacetophenone structure, and other acetophenone derivatives such as dialkoxyacetophenones, alpha-aminoacetophenones, and chlorinated acetophenones, may be employed. Still other suitable photoinitiators include benzophenone and derivatives thereof, especially water soluble derivatives such as p-benzoylbenzyltrimethylammonium bromide, and thioxanthone derivatives, especially water soluble thioxanthones such as [3-(3,4-dimethyl-9-oxo-9H-thioxanthen-2-yloxy)-2-hydroxypropyl]trimethylammonium chloride. Amines, especially water soluble amines such as methyl diethanolamine, are employable in combination with benzophenone and related compounds. Similarly, thioxanthone derivatives can be used when combined with alpha-amino acetophenones.

Well known photoinitiators such as benzoin, benzoin ethers, benzyl ketals, acylphosphine oxides, camphorquinone, and bisimidazole may also be employed in the present invention. Azo compounds such as azobis(2-amidinopropane)dihydrochloride or azobisisobutyronitrile that typically absorb in the region of 360 nm can also be used, although these might thermally decompose in large part in the initial dark polymerization, especially for a high-solids adiabatic polymerization, so as to perhaps render these compounds somewhat less effective as compared to other photoinitiators.

Preferred photoinitiators for this invention are hydroxycyclohexyl phenyl ketone, 2-hydroxy-1-[4-(hydroxyethoxy) phenyl]-2-methyl-1-propanone, and 2-hydroxy-2-methyl-1-phenylpropan-1-one, which are commercially available under the tradenames IRGACURE 184, IRGACURE 2959 and DAROCUR 1173, respectively, from Ciba Specialty Chemicals.

IRGACURE 2959 or DAROCUR 1173 are soluble or dispersible in the aqueous monomer solutions used for gel polymerizations and are therefore preferred due to their ease of incorporation in the process. Other similar soluble or dispersible photoinitiators are desirably used. However, photoinitiators that have only slight aqueous solubility, such as benzil alkyl ethers, function efficiently for gel photopolymerizations when such initiators are first dissolved in suitable solvents and then mixed into the aqueous monomer solution, as taught, for example, in U.S. Pat. No. 4,178,221. Therefore, such photoinitiators would also function in the present invention if introduced in a similar manner to the monomer solution.

In some instances it may be acceptable to add at least a portion of the photoinitiator to the comminuted gel particles. It is believed that since the gel particles are somewhat permeable to external additives, a photoinitiator may be absorbed into the particles to an extent sufficient to help promote further polymerization and reduction in the residual monomer content.

The method of forming gelled polymer is not particularly limited in the practice of the present invention, provided that the product of the initial polymerization is capable of being comminuted, and provided that unreacted monomer is susceptible to photoinitiated polymerization to reduce the residual monomer content. Acrylamide gels are generally formed from an aqueous solution containing acrylamide monomer and photoinitiator. However, other methods of forming gelled polymer may be used, such as emulsion polymerization or suspension polymerization. In such cases, the mixture from which the initial polymer is formed may be a suspension or an emulsion.

The process uses conventional gel polymerization techniques to produce a gel of any thickness suitable for comminution to produce particles for irradiation. The gel may be produced continuously on a belt, or in discrete batches in vats or bags. Standard redox initiation systems containing an oxidant such as ammonium persulfate and a reductant such as sodium bisulfite may be employed. Alternatively, or in addition, an azo initiator such as azobis(2-amidinopropane) dihydrochloride or azobisisobutyronitrile may be used. Equivalents of these known initiators may be used, for example, an oxidizing agent alone has been utilized as an initiator. The use of a redox/azo system is especially preferred because it is well suited for the high-volume production of gel particles containing unreacted photoinitiator, such that the photoinitiator can be utilized in a subsequent irradiation step for the efficient reduction of residual monomer. The use of redox and azo initiators, per se, is known, and the selection of suitable initiators for use with the present invention would be within the purview of one of ordinary skill in the art.

The gelled polymer is subjected to a comminution process to produce particles of which preferably at least 90% by weight are less than about 9.5 mm in size. Particles larger than about 9.5 mm are more difficult to dry and would not be expected to work especially well in the invention. More preferably, the gel particles are about 2 to 8 mm in size, where the stated size refers to the longest particle dimension before any significant drying has occurred. It will be realized that in a preferred embodiment of this invention in which the irradiation and drying steps are combined, the gel particles shrink in size as they are dried and, therefore, also as they are irradiated.

The determination of gel particle size is complicated by the fact that some gel particles stick tenaciously to the metal screens ordinarily used to determine particle size. When determining the particle size distribution, gel particles that stubbornly stick to the mesh screens are discounted. The particle size distribution of a typical batch of gel particles prepared according to the invention is as follows:

| Particle Size (mm) | Distribution (wt %) |
|---|---|
| >5.60 | 12.7 |
| >3.35 | 75.2 |
| >1.70 | 99.9 |
| <1.70 | 0.1 |

In a preferred embodiment, more than about 90% by weight of the gel particles will pass through a 9.5 mm screen. In a most preferred embodiment, more than about 70% by weight of the gel particles prior to any significant drying will pass through a 6.7 mm screen. In all of the above cases, the measurement is made before any significant drying.

Any method of drying the gel particles may be used, for example, a fluid-bed dryer. The gel particles are preferably tumbled under a light source during the irradiation step so that all of the particles are frequently brought to the outside surface of a bed of gel particles and are thus placed in the direct path of the light, unblocked or only partially blocked by other particles. The agitation provided by standard fluid-bed drying equipment is sufficient, but other mechanical means of providing the agitation can be employed, if desired. The fluid-bed dryer uses a flowing medium, such as air, to fluidize the gel particles and to maintain a desired bed volume throughout the drying process. The temperature during drying is generally between about 50 and 100° C. preferably between about 60 and 80° C., as measured in the middle of the bed of particles.

Pulverizing or comminuting the gelled polymer and subsequently or concomitantly irradiating the gel particles while they are being agitated under a light source is novel and can result in product with very low residual monomer without limiting the thickness of the gel during the initial polymerization stage, thereby allowing for high production rates on an industrial scale. Preferably, the comminuted gel particles are irradiated during the subsequent drying step; that is, the irradiation and drying steps are combined. Combining the irradiation and drying steps results in an efficient manufacturing process. Since irradiation does not affect the drying process, the overall time for a typical process of this invention is no longer than the standard redox/azo process practiced without irradiation. It has been found that pulverizing (comminuting) a thick section of gel followed by irradiation and drying of the agitated gel particles is much more efficient in terms of residual monomer reduction compared to irradiating a thick section of gel of equal mass followed by pulverization and drying.

It has been found that irradiation of gel particles that are substantially dried, for example, containing less than about 20% by weight of moisture, is quite effective. This is unexpected because the particles change from being partially transparent and rubbery to being opaque and hard as they are dried and reach a level of about 20% moisture. It was believed that the decreased light penetration and increased internal particle viscosity would render the UV irradiation process ineffective for such partially dried particles. However, to the contrary, irradiation of such dried particles was effective to reduce residual monomer content. From a practical viewpoint this discovery is important because it allows for the efficient combination of UV irradiation and drying, such that UV lamps placed towards the end of a linear industrial fluid-bed dryer used for mass production are effective, even though the particles are already substantially dried by the time they pass under the lamps.

The optimum wavelengths of light for such irradiation will depend on the specific photoinitiator employed, but, in general, the light source generally has an output in the about 200 to 650 nm range, preferably from about 200 to 400 nm (UV), and most preferably from about 320 to 400 nm. At least some of the light output should be at wavelengths at which the photoinitiator(s) absorb(s). Although glass absorbs a considerable portion of UV light, especially light below 320 nm, the light can be directed through a thin section of glass, for example, a glass window. Typical light sources suited for this invention include mercury arc lamps (low, medium, and high pressure), metal halide lamps, and electrode-less mercury vapor lamps, such as those produced by Fusion Systems Corporation. The power output of the light source for the wavelength range of 326 to 401 nm should be in the range of about 1 to about 140 mW/cm$^2$ as measured in the vicinity of the heap or bed of gel particles being irradiated. A more preferred range of intensity is between about 2 and about 20 mW/cm$^2$. As the artisan will appreciate, the specifics of process design will depend to some extent on the equipment used, including available commercial lamps for irradiating the gelled polymer.

It has been found for the preferred alpha-hydroxyacetophenone photoinitiators that irradiation using a source having wavelengths predominantly in the 320 to 400 nm range results in great reduction in residual monomer with only a slight loss in molecular weight as evidenced by loss in solution viscosity of the product. Use of a source producing predominantly 200 to 300 nm radiation (deep-UV) is effective from the viewpoint of residual acrylamide reduction, but results in a greater loss of solution viscosity. Therefore, in a more preferred embodiment of this invention, in which the UV irradiation and drying steps are combined, the UV light is directed through a glass window which acts to block the deep-UV radiation, while at the same time protecting the UV source from the heat and humidity of the dryer, as well as providing protection from gel particles in motion. As used herein, unless stated otherwise, intensity refers to light intensity at the surface of an irradiated gel polymer.

During the irradiation step the photoinitiator is activated by decomposition. It will be recognized that redox and/or azo initiator remaining in the gel particles could perhaps be activated, at least to some degree, by such irradiation, and could also promote reduction of residual monomer to some extent.

Under preferred conditions, the process does not result in any significant molecular weight degradation or production of water-insoluble material, such that high molecular weight polymer with good flocculant activity can be manufactured. Anionic and nonionic polyacrylamides with a solution viscosity of at least about 4.0 centipoise (cps) can be produced, as measured for a 0.1% polymer solution in 1 M sodium chloride at 25° C. using the UL-adapter on a Brookfield viscometer at 60 rpm. Similarly, cationic polyacrylamides with a viscosity of at least 2.3 cps can be produced. For the preferred polyacrylamides the intrinsic viscosity of the product formed typically ranges from about 5 to about 40 dl/g.

After drying and irradiating are complete, the polymer particles are milled and recovered. The recovered polymer particles may contain between about 5 and about 15 wt % moisture. Typically, the recovered particles contain about 10% moisture. The recovered particles preferably have a residual monomer content of less than 1000 ppm, based on the weight of the recovered particles. Preferably, the residual monomer of interest is acrylamide, and the recovered polymer particles contain less than about 100 ppm acrylamide, based on the weight of the recovered particles.

The present invention will be further described in detail with reference to the following illustrative examples.

EXAMPLES

Gelled polymers were prepared by polymerizing a reaction mixture containing a monomer, redox and/or azo initiators and a photoinitiator as follows:

Gelled Polymer Synthesis I

A cationic gel was prepared from 420 g of an aqueous solution containing 1000 ppm IRGACURE 2959, 24% acrylamide, 14% acryloxyethyl trimethylammonium chloride, and 2% adipic acid at a pH of 3.1 using as initiators 5 ppm ammonium persulfate, 5 ppm ferrous ammonium sulfate, and 660 ppm azobis(2-amidinopropane) dihydrochloride. The polymerization was conducted in the dark in a stoppered cylindrical Dewar flask that was 7 cm in diameter and 20 cm in depth. The initial temperature of the monomer solution was 0° C. and the final temperature after polymerization was about 90° C.

Reference Gelled Polymer Synthesis I

A cationic gel was prepared as in Synthesis Example I except the IRGACURE 2959 was omitted. No significant difference in the exotherm profile (plot of temperature versus time) was observed as compared to the gel preparation for Gelled Polymer Synthesis I.

Gelled Polymer Synthesis II

A cationic gel was prepared exactly as in Gelled Polymer Synthesis I except that 300 ppm DAROCUR 1173 was substituted for the 1000 ppm of IRGACURE 2959.

Gelled Polymer Synthesis III

A cationic gel was prepared as described in Gelled Polymer Synthesis I except that 1000 ppm IRGACURE 2959 was replaced with 300 ppm IRGACURE 184 (hydroxycyclohexyl phenyl ketone).

Gelled Polymer Synthesis IV

A cationic gel was prepared from 840 g of an aqueous solution containing 1000 ppm IRGACURE 2959, 24% acrylamide, 14% acryloxyethyl trimethylammonium chloride, and 2% adipic acid at a pH of 3.1 using as initiators 5 ppm ammonium persulfate, 5 ppm ferrous ammonium sulfate, and 660 ppm azobis(2-amidinopropane) dihydrochloride. The polymerization was conducted in the dark in a stoppered cylindrical Dewar flask that was 7 cm in diameter and 30 cm in depth. The initial temperature of the monomer solution was 0° C. and the final temperature after polymerization about 90° C.

Gelled Polymer Synthesis V

A cationic gel was prepared in the same way as in Gelled Polymer Synthesis IV except that 500 ppm IRGACURE 2959 was used instead of 1000 ppm.

Gelled Polymer Synthesis VI

Two further cationic gel samples, each weighing 840 g, were prepared with 1000 ppm IRGACURE 2959 as described above in Gelled Polymer Synthesis IV.

Gelled Polymer Synthesis VII

An anionic gel was prepared from 840 g of an aqueous solution containing 19% acrylamide, 14% sodium acrylate, and 2000 ppm DAROCUR 1173 at a pH of 7.8. The redox/azo initiators used were 8 ppm ammonium persulfate, 5 ppm ferrous ammonium sulfate, and 230 ppm azobis(2-amidinopropane)dihydrochloride. The polymerization was conducted in the dark in stoppered Dewar flasks. The initial temperature was 0° C. and the final temperatures after polymerization was about 92° C.

Reference Gelled Polymer Synthesis II

Another anionic gel was prepared according to the immediately preceding Gelled Polymer Synthesis Example VII, except that no DAROCUR 1173 photoinitiator was used.

Gelled Polymer Synthesis VIII

Cationic gels were prepared as in Gelled Polymer Synthesis I, except that 1000 ppm IRGACURE 2959 was replaced with 2000 ppm DAROCUR 1173.

The gelled polymers synthesized in Gelled Polymer Synthesis Examples I–VIII and Reference Gelled Polymer Synthesis Examples I and II were processed and the resulting products dried and otherwise processed to provide a final product.

Example 1

For a first batch of gelled polymer from Gelled Polymer Synthesis I, after permitting the polymerization to proceed in the dark for 16 hours, the flask stopper was removed and the gel immediately removed from the flask. The cylindrically shaped gel, 7 cm in diameter by 13 cm in depth, was removed from the flask, cut into 1-inch cubes, and the cubes fed through a commercial meat grinder having a cutting disc with a plurality of 4 mm holes. To the chopped gel thus obtained was added 4 ml of paraffin oil as a cutting aid, and the mass of gel was then further pulverized in an ordinary blender for about 30 seconds. The pulverized gel obtained in this way was dried in a fluid-bed dryer supplied by Lab-Line Instruments, Model 23852 for one hour at 70° C. using a 2-liter glass tub drying head.

A 400-watt metal halide UV lamp (ELC-4001 with UVA 365 nm source from Electrolite Corp.) was placed directly over the fluid-bed dryer so as to allow irradiation of the gel particles in the 2-liter tub during the full one hour period of drying. The bag which is normally placed on the 2-liter tub was absent so as not to block the radiation. The UV intensity was 15 $mW/cm^2$ as measured at the bottom of the dryer tub (in the absence of gel particles) using the radiometer. Measurements were made with an IL-1400 radiometer supplied by International Light connected to a mid-UV photoresist probe sensitive to radiation in the 326 to 401 nm range.

The distance from the bottom of the dryer tub to the glass window of the UV lamp housing was 32 cm. During the one-hour period of drying, the blower on the dryer was set so that the particles were tumbled on a bed of air as is normal practice. The dried and irradiated particles were finally milled at 16,000 rpm in a Fritsch Pulverisette 14 Model mill, and sieved to remove particles larger than 1.70 mm. The properties of the final product are given in Table 1.

Example 2

For a second batch of gelled polymer prepared according to Gelled Polymer Synthesis I, after allowing the polymerization to proceed in the dark for 16 hours, the flask stopper was removed and the gel immediately removed from the flask. The gel was cut, ground, and pulverized as described in Example 1. The gel particles were dried as in Example 1 except that the UV lamp was turned off after the first 20 minutes of drying, and then drying continued for another 40 minutes without UV irradiation. The properties of the final product are given in Table 1.

Comparative Example 1

For a third batch of gelled polymer produced by Gelled Polymer Synthesis I, after allowing the initial polymerization to proceed in the dark for 16 hours, the flask stopper was removed and the Dewar flask placed directly under a 400-watt metal halide UV lamp (ELC-4001 with UVA 365 nm source, from Electrolite Corp.) for one hour. The radiation intensity was 20 $mW/cm^2$ as measured at the top surface of the gel, and 15 $mW/cm^2$ as measured at a point adjacent to the bottom of the gel, equidistant from the lamp. The measurement was not taken through the gel. The radiation passed through a 1/16" thick hinged glass window which is part of the UV lamp housing as received from the manufacturer.

After one hour of irradiation, the cylindrically shaped gel was removed from the flask, cut into cubes, ground, pulverized and dried for 60 minutes in the fluid-bed dryer, without irradiation. The dried particles were then milled and sieved as in Example 1 to obtain the product. The properties of such product are given in Table 1, wherein "AMD" refers to residual acrylamide. This example is a comparative example because radiation was conducted before comminution of the gelled polymer.

Comparative Example 2

For a fourth batch of gelled polymer synthesized according to Gelled Polymer Synthesis I, after allowing the polymerization to proceed in the dark for 16 hours, the flask stopper was removed and the gel immediately removed from the flask. The gel was cut, ground, and pulverized as described in Comparative Example 1. The gel particles were dried as in Example 1 except that the UV lamp was turned off so that the gel was not UV irradiated during drying. The properties of the final product are given in Table 1. No irradiation of comminuted particles was conducted.

Comparative Example 3

Gelled polymer was prepared according to Reference Gelled Polymer Synthesis I (omitting IRGACURE 2959)

and, after allowing the polymerization to proceed in the dark for 16 hours, the flask stopper was removed and the gel immediately removed from the flask. The gel was cut, ground, and pulverized as described in Comparative Example 1. The gel particles were dried as in Example 1, so that the gel particles were UV irradiated during the whole one-hour period of drying. The properties of the final product are given in Table 1. No photoinitiator was present.

Comparative Example 4

Gelled polymer was prepared according to Gelled Polymer Synthesis I and, after allowing the polymerization to proceed in the dark for 16 hrs, the flask stopper was removed and the gel immediately removed from the flask. The gel was cut, ground, and pulverized as described in Comparative Example 1. The gel particles were dried as in Example 1 except that the UV lamp was turned off so that the gel was not UV irradiated during drying. The properties of the final product are given in Table 1. No photoinitiator was present and no irradiation was conducted.

acrylic monomers of the invention are substituted for acrylamide monomer.

The solution viscosities obtained for all six products of Table 1 are indicative of high molecular weight product. It is noted that UV irradiation of pulverized gel does lead to some slight viscosity loss, but this is only minimal (less than or equal to 0.2 cps) for the correct choice of formulation and conditions, as demonstrated by comparison of Example 2 (viscosity 2.8 cps) to Comparative Examples 2 and 4 (viscosity 2.9 cps). Such viscosity loss barely affects flocculant performance. No insoluble matter was observed in any of the solutions prepared for viscosity measurement.

Example 3

Gelled polymer was prepared according to Gelled Polymer Synthesis II.

After allowing the polymerization to proceed in the dark for 16 hours, the flask stopper was removed and the gel immediately removed from the flask. The gel was cut, ground, and pulverized as in Example 1, and a 280 gram portion thereof was UV irradiated during the first 30 minutes of drying in a manner as described in Example 1. The remainder of the pulverized gel was dried without UV irradiation as a comparative example. The final comparative product made without UV irradiation contained 470 ppm residual AMD and had viscosity 3.8 cps as compared to 90 ppm AMD and viscosity 3.5 cps for the inventive product made with UV irradiation. This Example illustrates the utility of DAROCUR 1173, even when as little as 300 ppm is used in preparation of the aqueous monomer solution.

TABLE 1

| Example | Irgacure-2959 (ppm) | treatment | residual AMD (ppm) | residual comonomer[1/] (ppm) | viscosity[2/] |
|---|---|---|---|---|---|
| Example 1 | 1000 | UV irradiation (1 hr) of pulverized gel while drying | 25 | 84 | 2.6 |
| Example 2 | 1000 | UV irradiation (20 min) of pulverized gel while drying | 70 | 112 | 2.8 |
| Comp. Ex. 1 | 1000 | UV irradiation (1 hr) of whole gel, then dried with no UV | 375 | 246 | 3.0 |
| Comp. Ex. 2 | 1000 | pulverized and dried normally without irradiation | 630 | 765 | 2.9 |
| Comp. Ex. 3 | 0 | UV irradiation (1 hr) of pulverized gel while drying | 400 | 613 | 2.6 |
| Comp. Ex. 4 | 0 | pulverized and dried normally without irradiation | 658 | 839 | 2.9 |

[1/]acryloxyethyl trimethylammonium chloride comonomer
[2/]As measured for a 0.1% polymer solution in 1 M sodium chloride at 25° C. using the UL-adapter on a Brookfield viscometer at 60 rpm.

Comparison of data for inventive Examples 1 and 2 with that of Comparative Examples 2 and 4 in Table 1 shows the significant reduction in residual acrylamide as well as cationic comonomer that can be obtained by the present invention which uses radiation simultaneously with or after comminution to reduce residual monomer content. With reference to the data of Table 1, comparison of Example 1 and Comparative Example 1 shows the great efficiency that UV irradiation following comminution has as compared to UV irradiation before comminution. Comparative Examples 2 and 4 show that the presence of photoinitiator has no significant effect on the product properties in the absence of UV irradiation.

Comparative Examples 3 and 4 show only very small reduction in residual acrylamide when no photoinitiator was present.

The results obtained for Example 2 are surprising in that as little as 20 minutes of UV irradiation resulted in a residual acrylamide level of less than 100 ppm in the recovered polymer particles. Both Examples 1 and 2 illustrate the great efficiency of the invention for the production of product with less than 100 ppm acrylamide. The total process time for Examples 1 and 2 is no longer than that for the standard process without UV irradiation as exemplified by Comparative Example 4. This is a result of combining the irradiation and drying steps. Similar results are obtained when other

Examples 4–9 and Comparative Examples 5 and 6

Gelled polymer was prepared according to Gelled Polymer Synthesis IV for Examples 4 through 6 and Comparative Example 5 and according to Gelled Polymer Synthesis V for Examples 7 through 9 and Comparative Example 6.

After allowing the polymerizations to proceed in the dark for 16 hours, the flask stoppers were removed and the gels immediately removed from the flasks. The gels were each cut, ground, and pulverized as in Example 1, and 280 gram portions thereof were subjected to UV irradiation during the first 15 minutes, or full 60 minutes, of drying using different UV sources as set forth in Table 2 below. Smaller 25 gram portions of each were also dried without irradiation for comparison as shown in Comparative Examples 5 and 6. Irradiation using the UVA 365 nm UV source manufactured by Electrolite Corporation, having a preponderance of intensity in the range of 300 to 450 nm, was compared to irradiation using the UVB 260 nm source, which is much more intense in the range of 200 to 300 nm as compared to the UVA source. That is, irradiation with near-UV energy was compared to irradiation with deep-UV. The UVA source is rich in near-UV (300 to 400 nm), while the UVB source is rich in deep-UV (200 to 300 nm). For irradiation with the UVB source, the glass window of the UV lamp housing was removed since this would block the desired deep-UV radiation. For comparison, irradiation of a gel portion with the UVA source was made without the glass window, or "filter," so-called because the glass blocks irradiation below 320 nm, and especially below 300 nm. The particles were irradiated during drying by placing the UV lamp housing 32 cm above the fluid-bed dryer fitted with the open 2-liter tub as before.

TABLE 2

| Example | source | filter | Irgacure 2959 (ppm) | irradiation time (min) | residual AMD (ppm) | Viscosity[1/] (cps) |
|---|---|---|---|---|---|---|
| Comp. Ex. 5 | none | none | 1000 | 0 | 650 | 3.1 |
| Ex. 4 | UVA | glass | 1000 | 15 | 70 | 2.9 |
| Ex. 5 | UVA | none | 1000 | 15 | <20 | 2.7 |
| Ex. 6 | UVB | none | 1000 | 15 | <20 | 2.6 |
| Comp. Ex. 6 | none | none | 500 | 0 | 720 | 3.1 |
| Ex. 7 | UVA | glass | 500 | 15 | 120 | 3.0 |
| Ex. 8 | UVA | glass | 500 | 60 | 30 | 2.9 |
| Ex. 9 | UVB | none | 500 | 15 | 40 | 2.5 |

[1/]As measured for a 0.1% polymer solution in 1 M sodium chloride at 25° C. using the UL-adapter on a Brookfield viscometer at 60 rpm.

In the first four entries of Table 2 it is demonstrated that deep-UV is more effective than near-UV in terms of residual monomer reduction. However, the inclusion of deep-UV by use of the UVB source or removal of the glass filter results in greater loss of viscosity. Comparison of the last two entries illustrates that for 500 ppm IRGACURE 2959, a 60 minute irradiation using the UVA source with the glass filter is about equal to a 15 minute irradiation with the UVB source in terms of residual acrylamide reduction, but the latter treatment (UVB source) results in significantly lower viscosity (2.5 cps) as compared to the former (2.9 cps for the UVA source) or to the control (3.1 cps). Therefore, it is preferred to irradiate for a longer time with near-UV than for a shorter period with irradiation that includes deep-UV in order to reach a target residual monomer level.

Example 10

Gelled polymer was prepared according to Gelled Polymer Synthesis VI.

After allowing the polymerizations to proceed in the dark for 16 hours, the flask stoppers were removed and the gels immediately removed from the flasks. The gels were each cut, ground, and pulverized as in Example 1, and then combined to make a single batch of pulverized gel. Portions of this batch, each weighing 260 grams, were subjected to UV irradiation during either the first, second, third, or fourth quarter of the 60 minute drying time using the fluid bed dryer with the UV lamp (UVA source with the glass filter, 15 $mW/cm^2$) set up 32 cm overhead as described in Example 1. The moisture levels of the gel samples were calculated based on the measured weight loss after each quarter of drying and the known initial moisture content. A portion of gel was also dried without irradiation for comparison. The results presented below in Table 3 show that UV irradiation during the second quarter of drying is as effective as during the first quarter, despite the fact that the particles are substantially dry (18% moisture) at the start of the second quarter. Irradiation during the third quarter is not as effective, and irradiation during the fourth quarter still less so. However, even for irradiation during the fourth quarter, a significant decrease in residual acrylamide relative to the control is still observed.

TABLE 3

| quarter of 60 min drying time during which UV irradiation applied | residual AMD[1/] (ppm) | wt % moisture at start of quarter |
|---|---|---|
| none (control) | 660 | n/a |
| first | 80 | 60 |
| second | 80 | 18 |
| third | 120 | 10 |
| fourth | 200 | 8 |

[1/]As determined for the final after 60 min drying

Example 11 and 12 and Comparative Examples 7–9

Gel samples were prepared as described in Gel Synthesis VII and Reference Gelled Polymer Synthesis II.

The gels were cut, ground and pulverized as in Example 1. Samples in the amount of 280 g each were UV irradiated with a 400 watt metal halide UV lamp (ELC-4001 with UVA 365 nm source, Electrolite Corp.) for fifteen, five or zero minutes, as set forth on Table 4. Some samples were exposed to irradiation of 15 $mW/cm^2$ intensity from the start of drying while other samples were irradiated after seven minutes of drying, also as set forth on Table 4. The entries on Table 4 demonstrate that the invention is useful to obtain drastic reductions in sodium acrylate as well as acrylamide residual monomer. It can also be seen that UV irradiation in the absence of photoinitiator results in some reduction in residual monomer but this is a small effect as compared to irradiation of gel containing photoinitiator.

TABLE 4

| Example/ Comp. Ex. | Darocur 1173 (ppm) | irradiation time (min) | drying time when UV started (min) | residual AMD (ppm) | residual sodium acrylate (ppm) | viscosity (cps) |
|---|---|---|---|---|---|---|
| Ex. 11 | 2000 | 5 | 7 | <20 | 1270 | 5.5 |
| Ex. 12 | 2000 | 15 | 0 | <20 | 490 | 4.9 |
| Comp. Ex. 7 | 2000 | 0 | n/a | 160 | 8000 | 5.4 |
| Comp. Ex. 8 | 0 | 0 | n/a | 180 | 7850 | 4.7 |
| Comp. Ex. 9 | 0 | 15 | 0 | 100 | 6000 | 4.3 |

Examples 13–20 and Comparative Examples 10–12

Cationic gels weighing 420 grams were prepared using 2000 ppm DAROCUR 1173, as described in Gelled Polymer Synthesis VIII. The gels were cut, ground and pulverized as in Example 1. In Examples 13–20, 280-gram samples were taken and irradiated during drying with a 400-watt metal halide UV lamp, also as in Example 1. The remaining portions of the gel were dried without UV irradiation as Comparative Examples 10–12. In certain Examples, the intensity of UV irradiation was varied by changing the distance between the lamp and the gel. In other Examples the duration of the UV irradiation was varied. Further, in several Examples, UV irradiation was commenced seven minutes after commencement of drying. The results are provided below in Table 5.

TABLE 5

| Ex./Comp. Ex. | intensity ($mW/cm^2$) | irradiation time (min) | drying time when UV started (min) | residual AMD (ppm) |
|---|---|---|---|---|
| Comp. Ex. 10 | 2 | 0 | n/a | 810 |
| Ex. 13 | 2 | 30 | 0 | 130 |
| Ex. 14 | 2 | 60 | 0 | 90 |
| Comp. Ex. 11 | 8 | 0 | n/a | 680 |
| Ex. 15 | 8 | 5 | 7 | 80 |
| Ex. 16 | 8 | 10 | 7 | 70 |
| Ex. 17 | 8 | 20 | 0 | <20 |
| Ex. 18 | 8 | 30 | 7 | <20 |
| Comp. Ex. 12 | 15 | 0 | n/a | 680 |
| Ex. 19 | 15 | 2.5 | 7 | 150 |
| Ex. 20 | 15 | 5 | 7 | 70 |

A greater intensity of UV irradiation increased the reduction in residual acrylamide monomer. In Example 15, only five minutes of irradiation with UV light having an intensity of 8 $mW/cm^2$was sufficient to reduce residual acrylamide to 80 ppm, and in Example 20, only 5 minutes irradiation at 15 $mW/cm^2$ reduced residual acrylamide monomer content to 70 ppm. Increasing the irradiation time is seen to reduce residual monomer content for a given intensity.

Other embodiments and variations of the invention will be apparent to those of ordinary skill in the art. This invention is not to be limited except as set forth on the claim which follows:

What is claimed is:

1. A process of preparing an acrylic polymer comprising, in sequence, the steps of:

(a) forming a gelled polymer by polymerizing a mixture containing an acrylic monomer and a photoinitiator in the absence of applied ultraviolet (uv) radiation;

(b) comminuting said gelled polymer to produce gel particles; and (c) irradiating said gel particles with light to decompose the photoinitiator added in step (a), wherein step (c) is performed simultaneously with or after step (b).

2. The process of claim 1 further comprising the step of recovering polymer particles after step (c), said polymer particles containing less than about 1000 ppm unreacted acrylic monomer, based on the weight of the polymer particles.

3. The process of claim 1 wherein said acrylic monomer comprises an acrylate.

4. The process of claim 1 wherein said acrylic monomer comprises an acrylic acid.

5. A process for preparing an acrylamide polymer comprising, in sequence, the steps of:

(a) forming gelled polymer by polymerizing a mixture containing an acrylamide monomer and a photoinitiator in the absence of applied UV radiation;

(b) comminuting said gelled polymer to produce gel particles; and (c) irradiating said gel particles with light to decompose the photoinitiator added in step (a), wherein step (c) is performed simultaneously with or after step (b).

6. The process of claim 5 further comprising the step of recovering polymer particles after step (c), said polymer particles containing less than about 1000 ppm unreacted acrylamide, based on the weight of the polymer particles.

7. The process of claim 6, wherein said polymer particles contain less than about 100 ppm unreacted acrylamide monomer, based on the weight of the polymer particles.

8. The process of claim 5 wherein said mixture comprises an acrylamide monomer and a cationic monomer.

9. The process of claim 8 wherein said mixture monomer comprises aminoalkylacrylate and aminoalkylmethacrylate quaternaries.

10. The process of claim 1 or claim 5 further comprising a step of drying said gel particles.

11. The process of claim 1 or claim 5 wherein the step of forming a gelled polymer comprises initiating polymerization with a redox initiation system, an azo initiation system, or a redox-azo initiation system.

12. The process of claim 1 or claim 5 wherein at least 95% by weight of the monomer is converted to polymer during said step of forming a gelled polymer.

13. The process of claim 1 or claim 5 wherein at least 99% by weight of the monomer is converted to polymer during said step of forming a gelled polymer.

14. The process of claim 1 or claim 5 wherein said photoinitiator undergoes decomposition in response to ultraviolet light having a wavelength between 200–400 nm.

15. The process of claim 14 wherein said photoinitiator comprises 2-hydroxy-1-[4-(hydroxyethoxy)phenyl]-2-methyl-1-propanone.

16. The process of claim 14 wherein said photoinitiator comprises 2-hydroxy-2-methyl-1-phenylpropan-1-one.

17. The process of claim 14 wherein said photoinitiator comprises a mixture of 2-hydroxy-1-[4-(hydroxyethoxy) phenyl]-2-methyl-1-propanone and 2-hydroxy-2-methyl-1-phenylpropan-1-one.

18. The process of claim 14 wherein said light includes wavelengths between 200 and 400 nm.

19. The process of claim 14, wherein said light includes wavelengths between 320 and 400 nm.

20. The process of claim 14, including the step of employing a glass filter to obtain wavelengths of light sufficient to decompose the photoinitiator.

21. The process of claim 1 or claim 5 wherein said light has an intensity between about 1 and about 140 $mW/cm^2$.

22. The process of claim 1 or claim 5 wherein said light has an intensity between about 2 and about 20 $mW/cm^2$.

23. The process of claim 1 or claim 5 wherein said irradiating has a duration between about 1 minute and about 120 minutes.

24. The process of claim 1 or claim 5 wherein said irradiating has a duration between about 10 minutes and about 60 minutes.

25. The process of claim 1 or claim 5 wherein said mixture is an aqueous solution and contains between about 20 and about 60% by weight of monomer.

26. The process of claim 1 or claim 5 wherein at least about 90% by weight of said gel particles are less than 9.5 mm in size.

27. The process of claim 1 or claim 5 wherein at least about 70% by weight of said gel particles are between about 2 mm to 8 mm in size.

28. A process of preparing an acrylic or acrylamide polymer comprising, in sequence, the steps of:

(a) forming a gelled polymer by polymerizing a mixture containing an acrylic or acrylamide monomer and a photoinitiator;

(b) comminuting said gelled polymer to produce gel particles;

(c) irradiating said gel particles with light to decompose the photoinitiator added in step (a); and (d) drying said gel particles, wherein said step (c) is performed after said step (b) and said step of drying is performed during said step of irradiating.

29. The process of claim 28, wherein said step of drying is performed with agitation.

30. The process of claim 29, wherein said step of drying is performed in a fluid-bed dryer.

31. The process of claim 30 including employing a glass window to separate a radiation source and an interior surface of the fluid-bed dryer such that the light passes through the glass window before entering the fluid-bed dryer in order to protect the radiation source from being contacted by any of the gel particles, heat or humidity in the dryer.

32. The process of claim 28, wherein said drying step begins before said irradiating step so that the gel particles contain less than about 25% moisture by weight at the start of the irradiating step.

33. A process of preparing an acrylamide polymer comprising the steps of:

(a) forming a gelled polymer by polymerizing an aqueous solution containing an acrylamide monomer and a photoinitiator in the absence of applied UV radiation;

(b) comminuting said gelled polymer to produce gel particles;

(c) drying said gel particles in a fluid-bed dryer; and (d) irradiating said gel particles with light during at least part of said drying step to decompose the photoinitiator added in step (a), wherein step (c) is performed simultaneously with or after step (b).

34. The process of claim 33 further comprising the step of crushing said gel particles after irradiating and recovering polymer particles having less than about 100 ppm unreacted acrylamide monomer, based on the weight of the polymer particles.

* * * * *

UNITED STATES PATENT AND TRADEMARK OFFICE
CERTIFICATE OF CORRECTION

PATENT NO. : 6,262,141 B1
DATED : July 17, 2001
INVENTOR(S) : Douglas A. Cywar et al.

It is certified that error appears in the above-identified patent and that said Letters Patent is hereby corrected as shown below:

Title page,
Item [56], References Cited, under FOREIGN PATENT DOCUMENTS,
"10-298215 10/1998 (JP)" should read -- 10-298215 11/1998 (JP) --; and
"61-115909 6/1999 (JP)" should read -- 61-115909 6/1986 (JP) --.

Column 2,
Line 7, "However" should read -- However, --.

Column 15,
Line 30, "on the claim" should read -- in the claims --; and
Line 31, "follows:" should read -- follow: --.

Signed and Sealed this

Thirtieth Day of April, 2002

*Attest:*

JAMES E. ROGAN
*Director of the United States Patent and Trademark Office*

*Attesting Officer*